G. J. COSTELLO.
PIPE BENDING AND OFFSETTING MACHINE.
APPLICATION FILED JUNE 11, 1908.
996,064.
Patented June 27, 1911.
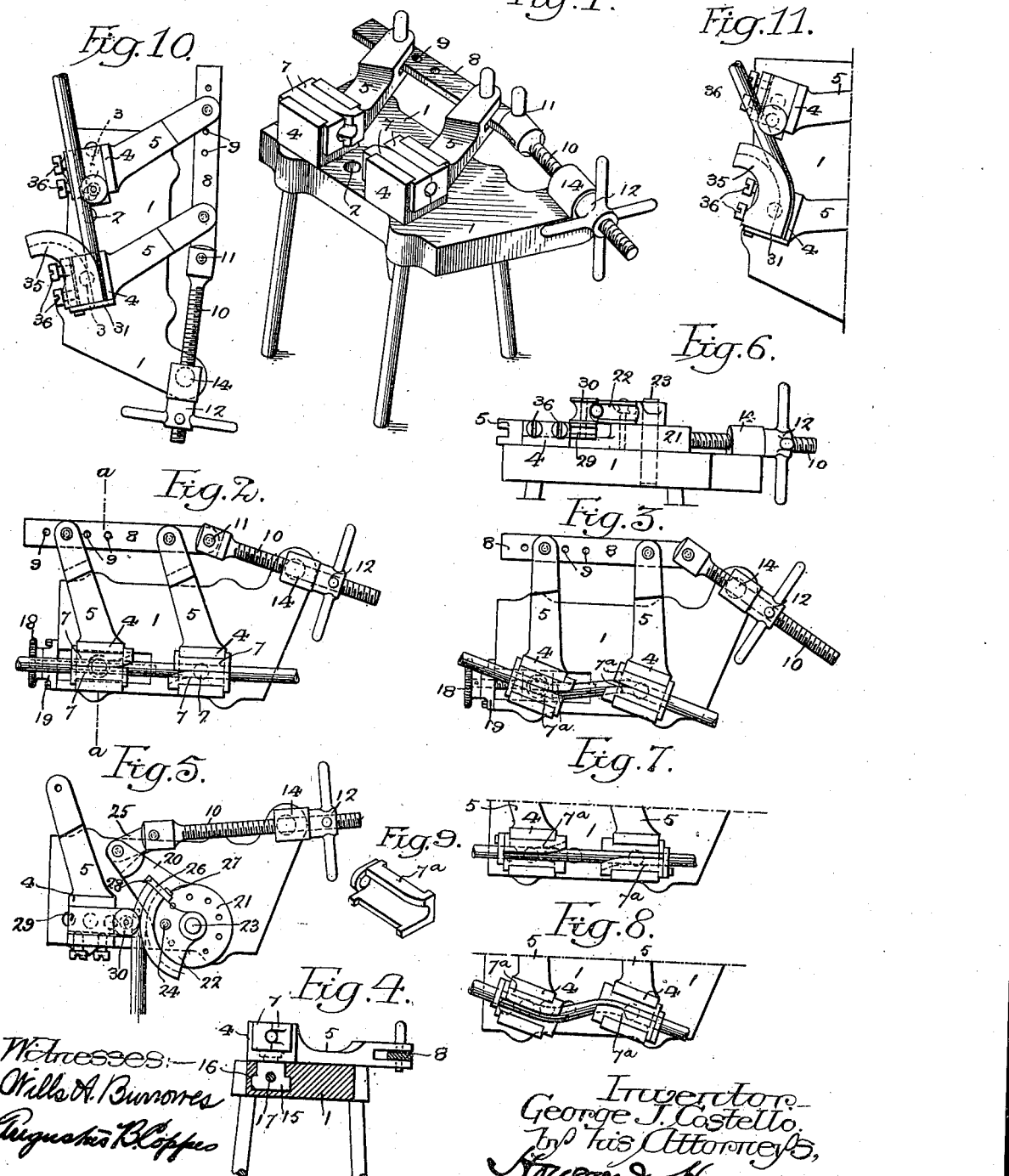

UNITED STATES PATENT OFFICE.

GEORGE J. COSTELLO, OF PHILADELPHIA, PENNSYLVANIA.

PIPE BENDING AND OFFSETTING MACHINE.

996,064. Specification of Letters Patent. Patented June 27, 1911.

Application filed June 11, 1908. Serial No. 437,941.

*To all whom it may concern:*

Be it known that I, GEORGE J. COSTELLO, a citizen of the United States, residing in Philadelphia, Pennsylvania, have invented certain Improvements in Pipe Bending and Offsetting Machines, of which the following is a specification.

My invention relates to machines for manipulating hollow pipes or tubes for the purpose of bending the same in the arc of a circle or of offsetting one portion of the same with respect to another.

My invention is fully shown in the accompanying drawings, in which:

Figure 1, is perspective view of a pipe bending and offsetting machine made in accordance with my invention; Figs. 2 and 3, are plan views illustrating the mode of operating the same to provide pipe lengths with offset portions; Fig. 4, is a sectional view on the line $a-a$, Fig. 2; Fig. 5, is a plan view of one form of apparatus embodying my invention with the parts arranged to give a pipe or tube a quarter turn; Fig. 6, is a front elevation of Fig. 5; Figs. 7 and 8, are plan views of a part of the structure of the same character as Figs. 2 and 3, illustrating modified means for offsetting pipes or tubes; Fig. 9, is a perspective view of a detail of the structure illustrated in Figs. 7 and 8; Fig. 10, is a plan view of a modified form of structure embodying my invention for giving pipes or tubes a quarter turn or bend, and Fig. 11, is a similar view showing the pipe engaging members after they have been moved with respect to each other.

My improved device is capable of offsetting pipes, or of giving the same quarter turns, or turns of greater curvature, in their length, and in the following description I will refer to the offsetting means first.

In the several figures, 1 represents a table or bed-plate which may be horizontally disposed, having apertures 2 for the reception of pins 3 carrying jaws 4, which jaws are provided with arms 5 forming levers whereby they may be operated. A series of apertures are provided in the bed-plate to receive the pins carrying said jaws in order to permit the offsetting of different sizes of pipes or tubes, and to effect offsets of different lengths. Each of the jaws carries a guide or die to receive the pipe or tube, which guides or dies are made in half sections 7, so that they may embrace the pipe or tube before being dropped into engagement with the walls of the pivotally mounted jaws. As shown in the drawings, the arms 5 are connected by a link 8, which is provided with a series of apertures 9 to effect adjustment, so that movement imparted to one of said arms will be transmitted to the other.

To move the arms 5 and thereby shift the guides or dies carrying the pipe or tube relatively to each other, I provide a screw stem 10 connected at 11 to the link 8, and a nut 12 forming the hub of a suitable hand wheel or other means, which bears against a pivotally mounted and relatively fixed element 14 carried by the table or bed-plate of the machine, whereby upon turning said nut or hand wheel, movement will be imparted to the arms carrying the jaws and the latter will be shifted relatively to each other, causing the pipes retained in the guides or dies of the same to have one portion offset with respect to another. It will be understood, however, that any form of gearing or connection providing a means of moving said arms relatively to each other so as to offset the pipes held by the jaws, falls within the scope of my invention. It will be also understood that the same or similar means may be provided for spreading said arms apart or drawing the same together and thereby imparting similar movement to the jaws and effecting corresponding bends or curves in the pipe under operation, and that such arrangement and operation falls within the scope of my invention.

To facilitate the adjustment of the jaws when desiring to put an offset into a pipe, one of the same may be carried by a block 15 of T-shape adapted to a slideway 16 in the top of the bed-plate or table of the machine. To move this block, I provide a screw 17 passing said block, such screw having a hand wheel 18 whereby it may be turned, and a bearing 19 carried by the bed-plate to prevent endwise movement of the same. The use of a block of this character is particularly advantageous when it is desired to bend pipe into quarter turn curves, as a closer adjustment may be made. For the purpose of bending pipe in quarter turns, I remove one of the jaws, and arms, and provide an arm 20 having a circular end 21 pivotally disposed in the aperture from which jaw has been removed, said end carrying a pivoted member 22 formed in the shape of a segment of a circle and movable on a centrally disposed pin 23. This member is held in its adjusted positions with respect to the circular end of the arm by means of a locking pin 24. The screw stem 10 is directly connected to arm 20 by means of a link 25. The segmental member 22 carries a plate 26 pivoted at 27 to one end of the same and having an eye 28 to receive one end of the pipe or tube under treatment. Carried by the other jaw which is relatively fixed with respect to the structure but free to rotate is a block 29 having a roller 30 against which the tube will be moved in forming the quarter turn. Now by moving the arm carrying the segmental member 22, the pipe will follow the same, being held by the roller 30 against displacement and will receive a quarter turn or bend. If a single movement of the screw is not sufficient to put the full turn or bend in the pipe said screw can be backed off and the segmental member shifted with respect to the circular end of the arm 20, whereupon fresh engagement of the screw and said arm carrying the circular ends will extend the turn or bend of said pipe.

Still another way of bending or offsetting pipes or tubes is to provide open-sided guides or dies 7ª such as illustrated in Fig. 9, carried by the jaws 4 in the manner indicated in Figs. 7 and 8, with the pipe or tube engaged by a hook 31 carried by said guides. The arms of the jaws are connected together in the same manner as shown in Figs. 2 and 3, with the screw pivotally attached to the connecting member, and by moving said screw said arms will effect the desired curvature or bend in the tube or pipe.

In Figs. 10 and 11, I have shown means for putting a quarter bend or turn in a tube or pipe, which differs slightly from the means disclosed in Figs. 5 and 6. In this form of the structure, the jaws 4 with their arms 5 are employed, and in one of said jaws I mount a segmental member 35 which will be secured thereto by suitable set screws and which carries a hook 31 for engagement with the end of a tube or pipe. In the other jaw I mount a block 29 carrying a roller 30, which block is also secured in place by set screws. The arms of these jaws will be connected in exactly the same manner as shown in Fig. 2, and then by turning the nut or hand wheel 12, said jaws will be moved in respect to each other, and the pipe will be bent in the manner illustrated in Fig. 11.

The dies or guides, and the several blocks employed, may be held in the jaws by means of set screws 36. The jaws may have pins fitting in the apertures of the bed-plate, or they may be apertured to fit over pins carried by the bed-plate, or they may have portions arranged to be moved on ways in the bed-plate, as shown in Figs. 2 and 3.

While I have shown specific means for operating the jaws in the operation of bending or offsetting pipes or tubes comprising a connecting member with a screw and nut for moving said jaws with respect to each other, it will be understood that I do not wish to be limited to such form, and that my claims are to be understood as covering any form of gearing for accomplishing the desired result, as well as all equivalent means for moving the jaws with relation to each other for the purpose of bending or offsetting the tubes.

I claim:

1. In a pipe working machine, the combination of an apertured bed-plate or table, a pair of jaws pivotally mounted in said apertures and arranged to receive and hold a length of pipe or tubing, arms carried by said jaws, a link connecting said arms, and means for moving said link so as to bend or offset the pipe or tubing held by the jaws.

2. The combination, in a pipe working machine, of a supporting bed-plate having a series of apertures, pivotally mounted pipe engaging members disposed in certain of said apertures, means connecting said pipe engaging members together, and means for actuating said connection so as to move said members whereby a pipe engaged by the same may be bent or offset.

3. The combination, in a pipe working machine, of a bed-plate having a series of apertures therein, a plurality of pipe engaging members pivotally mounted in certain of said apertures, means for connecting said members whereby they may be moved simultaneously, and a screw stem operatively secured to said connection for moving said members whereby a pipe engaged by the same will be bent or offset.

4. The combination, in a pipe working machine, of a bed-plate having a series of apertures or sockets, arms pivotally mounted in certain of said apertures, said arms having jaws, removable pipe receiving members carried by said jaws, a slidable member carrying the socket for one of said arms whereby it may be adjusted with respect to the other, means for effecting such adjustment, and means for moving said arms whereby the pipe or tubing carried by the same will be bent or offset.

5. The combination, in a pipe working machine, of a bed-plate, arms pivotally mounted in said bed-plate, jaws carried by said arms and arranged to receive a length of pipe or tubing, a link connecting said arms, a screw stem connected to said link, an abutment carried by the table, and a hand wheel or nut turning on said screw against said abutment to move said link whereby the jaws carrying the pipe will be moved so as to bend or offset the same.

In testimony whereof, I have signed my name to this specification, in the presence of two subscribing witnesses.

GEORGE J. COSTELLO.

Witnesses:
MURRAY C. BOYER,
WM. A. BARR.

Copies of this patent may be obtained for five cents each, by addressing the "Commissioner of Patents, Washington, D. C."